United States Patent Office 2,865,885
Patented Dec. 23, 1958

2,865,885

POLYETHYLENICALLY UNSATURATED SUBSTITUTED BIS-AMINO POLYSILOXANES

Peter L. de Benneville, Philadelphia, and Marvin J. Hurwitz, Elkins Park, Pa., assignors to Rohm & Haas Company, Philadelphia, Pa., a corporation of Delaware No Drawing. Original application May 12, 1955, Serial No. 507,973. Divided and this application November 7, 1957, Serial No. 694,919

13 Claims. (Cl. 260—46.5)

This invention concerns novel polysiloxanes having terminal unsaturated groups of vinyl type connected to the silicon atoms of the polysiloxane through aliphatic groups comprising oxygen, sulfur, or nitrogen atoms in the linkage. The invention is also concerned with polymers and copolymers of such compounds and to methods for the preparation of such compounds. This application is a division of our copending application Serial No. 507,973, filed May 12, 1955.

The new monomeric compounds of the present invention have the structure of Formula I:

I)

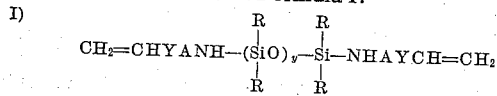

where Y is an oxygen or sulfur atom, A is a cyclohexylene or alkylene group having 2 to 8, preferably 2 to 4, carbon atoms, at least two thereof extending in a chain between the adjacent N and Y atoms, R is a lower alkyl group having 1 to 4 carbon atoms, preferably being methyl, and $y$ is an integral or mixed number having an average value from about 1 to 9.

The new compounds of Formula I may be made by reacting corresponding dichloropolysiloxanes of Formula II with an amine of Formula III, Formulas II and III being as follows:

(II)

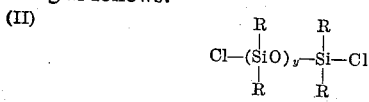

where R and $y$ are defined above;

(III)        $CH_2=CHYANH_2$ where Y and A are defined as before.

The chloropolysiloxanes of Formula II and their method of production are generally disclosed in U. S. Patent 2,381,366. These chloropolysiloxanes are reacted with two molar equivalents of an amine of Formula III. If desired, a mixture of two or more different amines within the scope of Formula III may be used to provide diaminopolysiloxanes which may include different substituted amine groups at each end of the polymeric molecule. In the reaction vessel, there may be present an excess of the amine over the two molar equivalents to serve as an acceptor for the hydrogen chloride produced. Preferably, however, a tertiary amine such as trimethylamine, triethylamine, pyridine or quinoline is used as such acceptor. The reaction with the amines may be effected at a temperature of about −20° C. to room temperature or above, preferably between −5° C. and +10° C. The reaction is preferably carried out in an anhydrous solvent, such as benzene, toluene, or xylenes, or one of the tertiary amines above. The reaction is rapid and exothermic and, therefore, it is preferred to add one of the reactants or a solution of one of the reactants to the other reactant or to a solution thereof in one of the anhydrous solvents mentioned above at a rate that is sufficiently slow to enable proper control of the temperature by cooling means. Generally, the reaction is complete at the end of the addition of one reactant to the other. Sufficient excess of amine or sufficient tertiary amine should be added to take up all of the hydrogen chloride liberated and preferably an excess over this amount is used.

An alternate mode of preparation which is generally advantageous and preferred for preparing certain of the compounds of Formula I is to prepare a diaminopolysiloxane of Formula V:

(V)        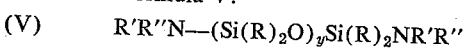

where R is a lower alkyl group having 1 to 4 carbons, methyl being preferred, R' and R" together may be the morpholino residue $=(CH_2CH_2)_2O$, the piperidino residue $—(CH_2)_5—$ or the pyrrolidino residue $—(CH_2)_4—$ or separately, R' may be phenyl, aralkyl, such as benzyl, cyclohexyl, or an alkyl group having 1 to 18 carbon atoms, R" may be hydrogen, aralkyl, such as benzyl, cyclohexyl, or an alkyl group having 1 to 8 carbon atoms, the total of carbon atoms in R' and R" being no greater than 8, with the proviso that when R' is an alkyl group having a tertiary carbon atom attached to the nitrogen, R" must be H.

A compound of Formula V is then reacted with two moles (per mole of Compound V) of an amine of Formula III, thereby producing a compound of Formula I with liberation of two moles of the by-product amine of the formula NHR'R". This reaction may be effected by simply mixing the diaminopolysiloxane of Formula V with the amine of III and heating the mixture to a temperature adequate to distil off the amine NHR'R" to be removed. This method is particularly applicable when the group —NR'R" is that of a low boiling amine, such as t-butylamine. The group —NR'R" may also correspond to that of methyl, ethyl, propyl, isopropyl, hexyl, phenyl, benzyl, octadecylamine, or the like, or it may correspond to morpholine, piperidine, pyrrolidine, dimethylamine, diethylamine, and so on. When a high boiling amine (NHR'R") is liberated which would require temperatures above about 100° C. to effect distillation, it is preferable to employ a vacuum to enable a lower temperature to be maintained in the reaction system. In any case, distillation of the amine formed on condensation leaves the desired product substantially free of impurities. No special step or steps for separating or purifying the product of Formula I is required.

Products of Formula I are generally liquids which are relatively non-volatile and high boiling. They are generally soluble in organic solvents including benzene, toluene, xylene, aliphatic hydrocarbons, naphthenic hydrocarbons including the solvent naphthas of both aliphatic and naphthenic types as well as of aromatic type, ethyl acetate, dimethylformamide, dimethylacetamide, acetone, dioxane, chlorinated hydrocarbons including chloroform, ethylenedichloride, carbon tetrachloride and so on.

The products of the present invention are useful as additives for lubricants of the hydrocarbon type. They may also serve as synthetic lubricating oils or as power transmission media in hydraulic systems.

The diethylenically unsaturated compounds of Formula I are adapted to undergo addition polymerization and may be polymerized either in bulk (when they are liquid or low-melting solids), or in solution, such as in benzene, toluene, xylenes, solvent naphthas, acetone, dioxane, acetonitrile, dimethylformamide or dimethylacetamide. The temperature of polymerization may be from about 45° C. to 100° C. or higher. The polymerization may be accelerated by free radical initiators such as benzoyl peroxide, acetyl peroxide, lauroyl peroxide, cumene hydroperoxide, or preferably those of the azo type such as azodiisobutyronitrile and the diesters and diamides of azodiisobutyric acid such as the dimethyl, diethyl, diisopropyl or dibutyl esters and the simple diamides or N-substituted amides including the N,N'-dimethylamide thereof. The time of polymerization may vary from 2 to 24 hours.

The compounds may be homopolymerized to highly cross-linked polymers by these methods or copolymerized thereby. Examples of comonomers that may be polymerized with the unsaturated silanes of the present invention and thereby converted into insoluble, cross-linked copolymers include acrylonitrile, vinyl chloride, vinylidene chloride, tetrafluoroethylene, the vinyl aromatic compounds, more particularly the vinyl aromatic hydrocarbons (e. g., styrene, isopropenyl toluene, vinyl toluene, the various dialkyl styrenes, etc.), other aliphatic compounds containing a $CH_2=C<$ grouping, e. g. the various substituted acrylonitrile (e. g. methacrylonitrile, ethacrylonitrile, phenylacrylonitrile, etc.), acrylamide and the various substituted acrylamides (e. g. methacrylamide, ethacrylamide, the various N-substituted acrylamides and N-substituted alkacrylamides, for instance N-methylol acrylamide, N-monoalkyl and -dialkyl acrylamides and methacrylamides, e. g. N-monomethyl, -ethyl, -propyl, -butyl, etc. and N,N-dimethyl-, diethyl-, dipropyl-, dibutyl-, etc., acrylamides and methacrylamides, N-monoaryl and -diaryl acrylamides and alkacrylamides, e. g. N-monophenyl and -diphenyl acrylamides and methacrylamides, etc.), dimethylaminoethyl acrylamide, quaternaries of the latter, such as that obtained with benzyl chloride, vinyl esters, e. g. vinyl acetate, vinyl propionate, vinyl butyrate, vinyl isobutyrate, vinyl valerate, etc., esters of an acrylic acid (including acrylic acid itself and the various alpha-substituted acrylic acids, e. g. methacrylic acid, ethacrylic acid, phenylacrylic acid, etc.), more particularly the alkyl esters of an acrylic acid, e. g., the ethyl, propyl, isopropyl, n-butyl, isobutyl, sec-butyl, tert-butyl, amyl, hexyl, heptyl, octyl, decyl, dodecyl, hexadecyl, octadecyl, etc. esters of acrylic, methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, as well as other vinyl aromatic and vinyl aliphatic compounds, and other compounds containing a single $CH_2=C<$ grouping.

The insoluble cross-linked polymers may be used for ion-exchange purposes. Molded products of infusible and insoluble character may be obtained by bulk copolymerization in a suitable mold. The compounds of Formula I may also be applied to fabricated articles of siliceous fibers, such as glass, asbestos, and mineral wool and polymerized in or on such articles so as to bind fibers thereof to impart dimensional stability thereto.

In the following examples which are illustrative of the present invention, the parts given are by weight unless otherwise noted:

Example 1

To a stirred mixture of 51.5 parts of β-aminoethyl vinyl sulfide, 101.2 parts of triethylamine, and 90 parts of dry benzene there is added dropwise a solution of 73 parts of an α,α'-dichloropolydimethylsiloxane mixture, having an average of 3.2 silicon atoms per molecule ($y=2.2$), and 90 parts of dry benzene, while the temperature is maintained at 0–5° C. The reaction mixture is then filtered and the filtrate stripped to yield an oily product, bis(vinylthioethylamino)polydimethylsiloxane, which is useful as a synthetic lubricant or a power transmission medium.

Example 2

The procedure of Example 1 is repeated substituting 57.5 parts of 2-methyl-2-aminopropyl vinyl ether for the sulfide. The oily product, bis-(1,1-dimethyl-2-vinyloxyethylamino)polydimethylsiloxane, is a viscous oil which, like that of Example 1, has lubricating properties.

Example 3

A mixture of 37.5 parts of 1,1,5-trimethyl-7-vinyloxyheptylamide and 85 parts of α,α'-di-t-butylaminopolyoxyheptylamide dibutylsiloxane (having y averaging about 7.5) is heated until 11.3 parts of t-butylamine is removed by distillation. The product is an oil useful as a lubricant, having the Formula IV:

(IV)
$$CH_2=CHOC_2H_4\overset{CH_3}{\underset{CH_3}{C}}(CH_2)_3NH\overset{CH_3}{\underset{C_4H_9}{Si}}(SiO)_{7.5}-\overset{C_4H_9}{\underset{C_4H_9}{Si}}NH\overset{CH_3}{\underset{CH_3}{C}}(CH_2)_3\overset{CH_3}{\underset{CH_3}{C}}C_2H_4OCH=CH_2$$

Example 4

A degassed mixture of 95 parts of methyl methacrylate, 5 parts of the product of Example 2 and 0.1 part of diethyl azodiisobutyrate is polymerized at a temperature of 80° C. for 8 hours in a closed glass mold of shallow depth. A flexible, tough, cast sheet is obtained on release from the mold.

Example 5

A mixture is made of 73 parts of α,ω-di-(t-butylamino)-polydimethylsiloxane (having y averaging about 2.2) and 35 parts of β-aminoethyl vinyl ether. It is heated until 28 parts of t-butylamine is removed by distillation. The product is a viscous oil having lubricating properties corresponding in structure to bis(vinyloxyethylamino)polydimethylsiloxane.

It is to be understood that changes and variations may be made without departing from the spirit and scope of the invention as defined in the appended claims.

We claim:
1. A compound having the formula:

$$CH_2=CHYANH-\overset{R}{\underset{R}{Si}}(SiO)_y-\overset{R}{\underset{R}{Si}}-NHAYCH=CH_2$$

where Y is selected from the group consisting of oxygen and sulfur, A is selected from the group consisting of cyclohexylene and alkylene groups having 2 to 8 carbon atoms, at least two thereof extending in a chain between the adjacent N and Y atoms, R is a lower alkyl group having 1 to 4 carbon atoms, and y is a number having an average value from about 1 to 9.

2. An addition polymer of a compound defined in claim 1.

3. An addition copolymer of a compound defined in claim 1 with a different monoethylenically unsaturated comonomer containing a single terminal $CH_2=C=$ group.

4. An addition copolymer of a compound defined in claim 1 with methyl methacrylate.

5. Bis-(vinylthioethylamino)polydimethylsiloxane.

6. Bis-(1,1-dimethyl-2-vinyloxyethylamino)polydimethylsiloxane.

7. A compound of the formula $$CH_2=CHOC_2H_4\overset{CH_3}{\underset{CH_3}{C}}(CH_2)_3NH\overset{CH_3}{\underset{C_4H_9}{Si}}(SiO)_{7.5}-\overset{C_4H_9}{\underset{C_4H_9}{Si}}NH\overset{CH_3}{\underset{CH_3}{C}}(CH_2)_3\overset{CH_3}{\underset{CH_3}{C}}C_2H_4OCH=CH_2$$

in which $C_2H_4$ is the ethylene group of the formula $-CH_2CH_2-$ and $C_4H_9$ is a butyl group.

8. An addition copolymer of bis-(1,1-dimethyl-2-vinyloxyethylamino)polydimethylsiloxane with a different copolymerizable unsaturated monomer containing a single terminal $CH_2=C=$ group.

9. An addition copolymer of bis-(1,1-dimethyl-2-vinyl-oxyethylamino)polydimethylsiloxane with methyl methacrylate.

10. A method comprising reacting, at a temperature of about $-20°$ C. to about room temperature, an amine of the formula $CH_2=CHYANH_2$ with a compound of the formula $Cl-(Si(R)_2O)_y-Si(R)_2-Cl$ where Y is selected from the group consisting of oxygen and sulfur, A is selected from the group consisting of cyclohexylene and alkylene groups having 2 to 8 carbon atoms, at least two thereof extending in a chain between the adjacent N and Y atoms, R is a lower alkyl group having 1 to 4 carbon atoms, and $y$ is a number having an average value from about 1 to 9.

11. A method as defined in claim 10 in which the reaction is effected in the presence of an amount of the amine in excess of two moles per mole of the dichloropolysiloxane.

12. A method as defined in claim 10 in which the reaction is effected in the presence of a tertiary amine to accept the hydrogen chloride developed in the reaction.

13. A method comprising mixing an amine of the formula $CH_2=CHYANH_2$ with a compound of the formula $R'R''N-(Si(R)_2O)_ySi(R)_2NR'R''$ where Y is selected from the group consisting of oxygen and sulfur, A is selected from the group consisting of cyclohexylene and alkylene groups having 2 to 8 carbon atoms, at least two thereof extending in a chain between the adjacent N and Y atoms, R is a lower alkyl group having 1 to 4 carbon atoms, and $y$ is a number having an average value from about 1 to 9, R' and R'' are selected from the group consisting of radicals directly attached only to the adjoining N atom and radicals which together and with the adjoining N atom form a heterocyclic nucleus selected from the group consisting of morpholino, piperidino, and pyrrolidino, R', when directly attached only to the adjoining N atom, is selected from the group consisting of phenyl, aralkyl, cyclohexyl, and alkyl groups of 1 to 18 carbon atoms, R'', when directly attached only to the adjoining N atom, is selected from the group consisting of H, aralkyl, cyclohexyl and alkyl groups having 1 to 18 carbon atoms, the total of carbon atoms in R' and R'' being no greater than 18, with the proviso that when R' is an alkyl group having a tertiary carbon atom attached to the nitrogen, R'' must be H, and heating the mixture to distill off an amine NHR'R''.

No references cited.